United States Patent [19]

Bokareva et al.

[11] Patent Number: 4,963,650

[45] Date of Patent: Oct. 16, 1990

[54] PROCESS FOR SEPARATING LOW MOLECULAR WEIGHT COMPOUNDS FROM POLYCAPROAMIDE MELT WITH SUPERHEATED STEAM

[75] Inventors: Elvina Z. Bokareva; Jelena V. Schinkorenko; Viktor V. Terenko; Larisa A. Nosova; Garri I. Faidel; Sijar N. Nurmuchomedov, all of Moscow; Anatolij V. Beljakov; Ivan M. Vlasov, both of Kalinin, all of U.S.S.R.; Anton Fuerst; Heinz Herrmann, both of Stuttgart; Eckart Pantzer, Freiberg/Neckar; Bernhard Stoehrer, Pleidelsheim; Eberhard Uhland, Bietigheim-Bissingen; Hans Werner, Stuttgart, all of Fed. Rep. of Germany

[73] Assignees: Nautschno-Proisvodstvennoje Objedinenije "Plastmassy" Research Institute of Plastics, Moscow; Allunions-Wissenschafts- und Forschungsinstitut fuer synthetische Fasern (VNIISV), Kalinin, both of U.S.S.R.; Werner & Pfleiderer, Stuttgart, Fed. Rep. of Germany

[21] Appl. No.: 417,770

[22] Filed: Oct. 6, 1989

[30] Foreign Application Priority Data

Oct. 6, 1988 [SU] U.S.S.R. ............... 4486831

[51] Int. Cl.$^5$ ............................................. C08G 69/46
[52] U.S. Cl. ............................... 528/481; 528/323; 528/499; 528/500
[58] Field of Search ............... 528/481, 499, 500, 323

[56] References Cited

U.S. PATENT DOCUMENTS 3,361,721  1/1968  Markel et al. ............... 528/481
4,891,420  1/1990  Martin et al. ............... 528/481

Primary Examiner—Harold D. Anderson
Attorney, Agent, or Firm—Foley & Lardner, Schwartz, Jeffery, Schwaab, Mack, Blumenthal & Evans

[57] ABSTRACT

A process for separating low molecular weight compounds from a crude polycaproamide melt comprises heat treating the melt in vacuo with superheated steam, in an extruder having a plurality of degassing zones, under precise conditions of temperature, pressure and configuration, such that the occurrence of side reactions and dehydration of the melt are substantially eliminated, the molecular weight of the polymer during the heat treatment in vacuo, during transport and subsequent processing remains substantially unchanged, a residual content of low molecular weight compounds of $\leq 1.8\%$ is achieved, and the operating flexibility of the process is increased.

3 Claims, No Drawings

PROCESS FOR SEPARATING LOW MOLECULAR WEIGHT COMPOUNDS FROM POLYCAPROAMIDE MELT WITH SUPERHEATED STEAM

BACKGROUND OF THE INVENTION

The present invention relates to a process for producing polycaproamide (polyamide 6) and copolymers of caprolactam having a low content of monomers and oligomers, and which are obtained by separating the low molecular weight reaction products and the ε-caprolactam which has not been involved in the reaction from melts of the said polymers after the synthesis. The process is useful in the production of polyamide 6 (PA6) and copolymers based thereon.

The polycaproamide produced by polymerization of ε-caprolactam always contains a certain amount of low molecular weight compounds (mixture of low molecular weight compounds comprising ε-caprolactam and oligomers), which amount is determined by the synthesis temperature and is a consequence of the equilibrium state of the polymer-monomer system at a given temperature.

In the case of hydrolytic or anionic polymerization at a temperature of 240° to 280° C the proportion of low molecular weight compounds is 7 to 14%.

The low molecular weight compounds contained in the polymer reduce the physical-mechanical properties of the products and cause considerable difficulties during processing.

It has been proved on the basis of practical work with PA6, that the content of low molecular weight compounds should not exceed 1.5% in technical injection molding grades and should not exceed 1 to 2% in grades intended for fibers. Such properties in polyamide 6 are only achieved at the present time in the course of heat-and-water extraction of the low molecular weight compounds from the finished polymer granules. This procedure is carried out by a discontinuous or continuous process at a temperature of 100° to 200° C and a residence time of 5 to 20 hours. The consumption of demineralized water is on average 2 t/t of polymer.

After the heat-and-water extraction, the rinsing water, which contains the low molecular weight compounds, is subjected to concentration by evaporation to 50% of the solution with subsequent regeneration of caprolactam. The polymer requires prolonged drying. Overall, the process is characterized by high energy consumption and high space requirements.

In this connection, many attempts have been made to develop a more effective process for separating low molecular weight compounds from polyamide 6 after its synthesis, in particular by heating the polymer melt in vacuo. It was possible to achieve a residual content of low molecular weight compounds of 2 to 3% under laboratory conditions and of 3 to 5% under production conditions. ("Synthetische Polymer-Fasern" [Synthetic Polymer Fibers], T. Klare et al. 1966, Verlag "Mir", P. 171-172). A content of low molecular weight compounds in the polymer, after separation of the monomers, of 1.6 to 2%, and in the freshly formed fibers of 2.0 to 2.5% was achieved only with a relatively long duration of the monomer elimination process (8 to 10 hours) in vacuo, and in combination with a high melt temperature (SU-inventor's certificate No. 2882224, published Dec. 3, 1970, 29B, 3/60).

The chief difficulty in removing low molecular weight compounds (LMWCs) from polycaproamide melt is that the LMWCs contain about 1.5% (relative to the polymer) of high-melting, cyclic dimers, which cannot be separated from the polymer melt by heating the latter in vacuo at temperatures of 240° to 280° C, since their melting point is above 340° C. (CZ Chemie-Technik, volume 2, 1973, No. 3, P. 95-99).

Increasing the process temperature to 300° C and above in order to separate these compounds has the disadvantage that it displaces the equilibrium in the polymer-monomer system in the direction of increasing the quantity of monomers.

Moreover, additional difficulties arise in carrying out this process, since the cyclic ε-caprolactam dimer is easily sublimed and its solubility in caprolactam is slight. It can therefore easily enter the condenser system of the evaporator, where it is deposited in such a way that blockages and consequent malfunctions can occur in the evaporation.

Various processes are known for separating low molecular weight compounds from the polyamide 6 melt by heating it in vacuo in various evaporators, such as thin-layer apparatuses or extruders which are fitted with degassing devices.

According to Federal German Patent 2,503,308 C08G, 69/46, published Mar. 10, 1983 "Verfahren zur Gewinnung von Polykaprolaktam-Schmelze mit geringem Gehalt an Monomeren" [Process for producing polycaprolactam melt with a low content of monomers](Applicant, Bayer, Federal Republic of Germany) the polymer melt, which has not attained the equilibrium state, having a monomer content of 12 to 30% and a relative viscosity of 2.2 to 2.3, is subjected to heating in vacuo, and monomer (caprolactam) and cyclic dimer are separated in an evaporator (preferably a thin-layer apparatus) in a ratio of greater than 150:1 with a residual pressure of 6 to 60 Torr (6 to 60 mm Hg or 7.98-79.80 mbar). In this case, small amounts of dimer are evaporated simultaneously with the large amount of ε-caprolactam and remain dissolved in the resulting condensate.

The disadvantage of this process is by the authors' own account, a low utilization of the reactor due to a high content of low molecular weight monomer in the polymer and a high energy expenditure, which is associated with the distillation of a large amount of monomer.

According to Federal German Patent application No. 2,821,686, C08G, 69/19, published Nov. 22, 1979 "Verfahren zur Gewinnung von Polyamiden mit niedrigem Gehalt an Monomeren und Dimeren" [Process for the production of polyamides with a low content of monomers and dimers], a process is proposed which represents the further development of the process according to patent No. 2,503,308 and eliminates some of its disadvantages. A polycaproamide melt, which is in equilibrium, having a content of 7-8% of monomers and dimers and a specific viscosity of 2.55-2.78, is subjected to heating in vacuo at elevated temperatures, preferably 250°-290° C, and at a high vacuum, 0.3-5 Torr (0.3-5 mm Hg or 0.4-6.55 mbar), preferably 0.3-2 Torr (0.3-2 mm Hg or 0.4-2.66 mbar).

The difference with this process lies in the condensation of the low molecular weight compounds using the caprolactam melt which is being fed into the polymerization, thus preventing the deposit of condensed high-melting dimer in the pipework.

It is seen from the examples listed in the patent, that the residual content of monomer and dimers is 0.3 to 0.45%. The residual content of other oligomers is, however, not given in the examples; these also belong, as mentioned above, to the components of the low molecular weight compounds which are difficult to separate and their content in the original polycaproamide melt is about 1.6% (CZ Chemie-Technik, volume 2, 1973, No. 3, P. 95-99). Therefore, the residual content of low molecular weight compounds in this case may well be a total of 2%.

The high vacuum of 0.4 to about 6 mbar used in this process makes the design of the equipment considerably more difficult due to its sealing and due to reaching such degrees of vacuum. Moreover, as seen from the examples listed, such a treatment of polycaproamide melt, both in a thin-layer apparatus, and in a twin-screw extruder, leads in any case to an increase in the relative viscosity from 2.65-2.78 to 2.99-3.27, which is not always expedient.

The experiments carried out by the present inventors for the purpose of degassing polycaproamide melt by heating in vacuo on a twin screw extruder with 3 degassing zones, supplied by Werner & Pfleiderer GmbH, Federal Republic of Germany, using a residual pressure of 5 Torr (6.5 mbar) and a processing temperature range from 240° to 300° C revealed no actual possibility of achieving the desired residual content of low molecular weight compounds. The minimum value achieved was 1.8%. An increase in the relative viscosity from 2.72 to 3.12-3.55 was observed simultaneously with the separation of the low molecular weight compounds.

In the industrial production of polycaproamide, the use is known of the process of heating the polymer melt in vacuo in monomer distillation apparatuses, which function as continuous thin-layer apparatuses at a residual pressure of 1.33-13.3 mbar and at a temperature of 260° to 270° C. In this case, a residual content of LMWCs of $\geq 3\%$ is achieved within 6 to 8 hours, with a simultaneous increase in the relative polymer viscosity from 2.5 to 3.1-3.2. (Frischmann, K.E., Chruzin, N.A. "Herstellung der Kapronfaser" [Production of caproic fibers]M., Verlag "Chimija", 1976, P. 87-94). A disadvantage of this process is the concurrence of thermal degradation processes, which lead to gel formation in the polymer and to a worsening of polymer quality.

Processes are also known for separating low molecular weight compounds from the polyamide 6 melt using inert gas or steam (inventor's certificate No. 817032, published Mar. 30, 1981, C08G, 69/16; Federal German Patent Application No. 2,461,901, published July 8, 1976, C08G, 69/46; inventor's certificate No. 149,873, published May 9, 1966, B01d; Federal German Patent Application No. 2,340,261, published Mar. 6, 1975).

According to the process of inventor's certificate No. 817032, the separation of the low molecular weight compounds from the polycaproamide melt is carried out in an apparatus with a mixing device in the presence of superheated steam, the amount of the latter relative to the amount of low molecular weight compounds contained in the polymer before their distillation being 0.1:1 to 1:1. This process allows the production of a polymer with given molecular weights and with a reduced content of products arising from the undesired side reactions. According to this process, a residual content of low molecular weight compounds in the polymer of 3 to 6% is achieved, with simultaneous increase in the relative viscosity from 2.24 to 3.1-3.4.

According to the process of Federal German Patent Application No. 2,461,901, steam or nitrogen are used in a thin-layer evaporator and are fed through a perforated surface and intensively mixed with the polyamide film. The process affords a residual content of low molecular weight compounds of a minimum of 2%. Inventor's certificate No. 149,873 relates to the details of the design of the thin-layer apparatus, which permit the use of steam.

The technical solution (prototype) which comes next is a process for the separation of the oligomer components (low molecular weight compounds) from polyamides (Federal German Patent Application No. 2,340,261, C08G, 69/46, published Mar. 6, 1975). According to this process the separation of the low molecular weight compounds from the polyamide 6 melt is carried out in a continuous screw compounder (preferably of the ZSK type with intermeshing, self-cleaning screws), in which according to the description, saturated steam is introduced into the polymer melt at the melt temperature and is mixed with the melt. By virtue of the appropriate screw geometry, the pressure in the melt is increased and condensation of the introduced steam is brought about with the evolution of a certain amount of heat. The pressure in the system is then drastically reduced (but not below atmospheric pressure) by the appropriate construction of the screw elements, and the heat is led out of the system. The water evaporates together with the low molecular weight compounds and is led out of the extruder. The process can be carried out in steps in successively located zones.

The monomer components of the low molecular weight compounds are previously separated from the polymer melt, for example in two degassing zones, at a residual pressure of 1 to 10 Torr (1.33 to 13.33 mbar).

After separation of the oligomer components from the polyamide 6 melt, the latter is further subjected in the final step to vacuum degassing in order to separate remaining traces of monomers and water.

This process comes closest in technical character to the present invention.

Disadvantages of the prototype are:

1. The saturated steam used is to have the temperature of the polyamide 6 melt, i.e. 240° to 280° C, which corresponds to a steam pressure of 33.3-64.2 bar. In this case, it is necessary that the pressure of the polymer melt at the point of introduction of the saturated steam have a value somewhat lower than the latter values, but not much lower, since otherwise the steam can escape from the extruder in the direction opposite to the movement of melt, i.e. in the direction of lower resistance.

In the case of polyamide 6 melt, the maximum pressure which can be achieved in the steam incorporation zone of a twin screw compounder is about 20bar.

Ensuring a polymer melt pressure in the extruder of 33.3-64.2 bar is linked with the provision of screws with relatively high sealing properties, which can lead to local overheating due to high shear stresses. Moreover, the necessity arises here of extending the total length of the extruder with simultaneous loss of productivity.

2. The complete condensation of the saturated steam directly in the polymer melt, which is provided as a particular feature of the process, leads, as the author of the patent application correctly observes, to the evolution of a considerable amount of heat, namely 1593-1763 kJ/kg. Since in this case ideal conditions arise for heat transfer, heat being liberated in such amounts can increase the temperature of the polyamide melt by dozens of degrees in a short time.

For its part, this should lead to the displacement of the equilibrium in the polymer-monomer system in the direction of increasing the content of caprolactam, which must also be separated, in order to obtain the desired quality of the finished product. Consequently, additional efforts are necessary in order to separate and regenerate the said caprolactam.

3. The overheating of the polycaproamide melt in the presence of condensed water creates favorable conditions for the processes of thermal decomposition and hydrolysis with the development of undesired side reactions and the formation of branched products which always leads to a reduction of the molecular weight of the polymer and to gel formation.

4. The final stage of treating the polymer melt in vacuo, provided in the process, leads to dehydration of the polymer melt, which for its part according to existing data (for example Reining G., Golke U., "Uber das Polykondensationsstadium bei der Gewinnung von Polykaproamid" [Concerning the polycondensation stage in the production of polycaproamide], Hochmolekulare Verbindungen, 1973, Vol. (A) 15, No. 2, P. 372-379 ) causes the development of side reactions with the formation of branched structures and gel formation. Moreover, during the transport and processing of the dehydrated melt an uncontrollable increase occurs in the polymer viscosity. Therefore, the processing of the demonomerized melt to products which are subjected to orientation hardening is made more difficult and sometimes impossible.

5. In order to carry out the process according to the description a twin screw compounder with at least 4 degassing zones is necessary (two in order to remove monomer, at least one in order to remove the oiligoments, and one in order to remove the remaining traces of monomer and water). Equipment of this type is quite complex and very expensive.

OBJECTS OF THE INVENTION

A primary object of the present invention is to provide an improved process for separating low molecular weight components from polycaproamide melts and, in particular, to eliminate the occurrence of side reactions and the dehydration of the melt, to retain the molecular weight stability of the polymer both during the process of heat treatment in vacuo and during transport and the subsequent processing of the demonomerized melt, while simultaneously achieving a residual content of low molecular weight compounds of $\leq 1.8\%$ and increasing the processing flexibility.

Other objects of the invention will be apparent to one of ordinary skill in the art in light of the present disclosure.

SUMMARY OF THE INVENTION

The foregoing objects are achieved by providing a process for separating low molecular weight compounds from a crude polycaproamide melt, comprising the step of heat treating a crude polycaproamide melt, containing low molecular weight monomers and oligomers of caproamide and by-products thereof, said heat treatment being effected in vacuo, in an extruder having a plurality of degassing zones, wherein superheated steam is introduced into the polymer melt upstream of each degassing zone in a total amount of 30-150%, relative to the amount of low molecular weight compounds, the low molecular weight compounds and the superheated steam are withdrawn in 2 or more zones, a residual pressure of 2-50 mbar is maintained in all but the final zone and a residual pressure of 5 to 350 mbar is maintained in the final zone, and the melt temperature is either held constant between 240°-280° C or is steadily reduced over the length of the extruder from 280° C to 240° C, whereby the occurrence of side reactions and dehydration of the melt are substantially eliminated, the molecular weight of the polymer during the heat treatment in vacuo, during transport and subsequent processing remains substantially unchanged, a residual content of low molecular weight compounds of $\leq 1.8\%$ is achieved, and the operating flexibility of the process is increased.

DETAILED DESCRIPTION

The present invention is a process for separating low molecular weight compounds from a polycaproamide melt or copolymers based thereon, by heat treatment of the melt in vacuo in an extruder having several degassing zones with the introduction into the melt of steam at the melt temperature, wherein in order to eliminate the occurrence of side reactions and dehydration of the melt, and to ensure the molecular weight stability of the polymer during the heat treatment in vacuo, during transport and subsequent processing, while simultaneously achieving a residual content of low molecular weight compounds of $\leq 1.8\%$ by weight (all percentages herein are weight percentages unless otherwise indicated) and increasing the operating flexibility of the process, superheated steam is introduced into the polymer melt upstream of each degassing zone in a total amount of 30-150%, relative to the amount of low molecular weight compounds, the low molecular weight compounds and the superheated steam introduced are led off in 2-4 zones, while a residual pressure of 2-50 mbar is maintained in all zones except the final one and a residual pressure of 5 to 350 mbar is maintained in the final one, and the melt temperature is either held constant between 240°-280° C or is steadily reduced over the whole length of the extruder from 280° to 240° C.

The process of the invention can be used to demonomerize a melt of crude polycaproamide or a conventional copolymer of caproamide with minor amounts of other amide monomers. According to the process of the invention, the caproamide melt is introduced into the extruder at a temperature of 240° to 280° C through heated pipework, the extruder having a plurality of degassing zones. Upstream of each of these zones, nozzles are fitted for introducing superheated steam at the melt temperature. The total amount of superheated steam which has to be introduced into the polycaproamide melt before degassing is 30 to 150%, relative to the low molecular weight compounds contained in the polymer. The amount of steam introduced in each successive admission zone remains the same or steadily increases by in the range of 100 to 150% of that which was admitted in the preceding zone.

The polycaproamide melt which contains the steam distributed within it is subjected to vacuum in the degassing zones, where the evacuation of the steam introduced, together with the low molecular weight compounds, is carried out.

The value of the pressure in the degassing zones is 2.0 to 50 mbar except in the final zone, where it is 5 to 350 mbar.

It is possible to introduce the polyamide to the heat treatment in vacuo immediately after its synthesis, and also to demonomerize a polymer melt produced from crude polymer granules.

Important characteristics of the present process include in the following:

The superheated steam is introduced at a temperature of 240°-280° C into the polycaproamide melt or copolymer melt through a specially shaped nozzle and is mixed with the polymer melt by means of appropriately shaped screws. Such nozzles and screws are well known and have been used in the above-mentioned prior art processes. The polymer melt is then transported into the degassing zone of the extruder, where the steam together with the low molecular weight compounds is separated in vacuo.

In order to demonomerize the polycaproamide melt to a high degree, it is necessary to treat this melt several times with superheated steam, with subsequent degassing. In order to reduce the residual content of low molecular weight compounds from 14 to 1%, treatment of the melt in at least 3 successive zones is necessary, while at least two zones are necessary to reduce the residual content below 1.8%.

After each treatment of this type, the residual content of low molecular weight compounds decreases, while the task of removing them becomes more difficult at each occasion. The amount of steam which is to be introduced is therefore steadily increased at each subsequent treatment of the melt.

Simultaneously with the process of demonomerizing the polycaproamide melt under the action of heat, the reverse process of thermal decomposition is occurring in the extruder, in which case the amount of monomer forming is directly dependent on the temperature (cf. G. Klare et al. "Synthetische Polyamidfasern" [Synthetic polyamide fibers], P. 227–229). In order to retard this process, the temperature in the extruder zones is steadily reduced from 280° C to 240° C or held constant in this region. In order to ensure as effective a separation as possible of the low molecular weight compounds from the melt, a residual pressure of 2.0 to 50 mbar is maintained in all degassing zones of the extruder except the final one.

In order to avoid dehydration of the melt and a consequent impairment of the quality due to gel formation and variation of the molecular weight during transport and subsequent processing, the water content in the melt is strictly controlled and an equilibrium quantity of water is ensured. This is achieved by increasing the residual pressure in the final degassing zone, or in individual cases by introducing a calculated amount of steam into the melt in the final zone without subsequent degassing or with degassing at a residual pressure of 50 to 350 mbar.

The present invention has the following features:

1. Multiple treatment with superheated steam in an extruder of polycaproamide melt and copolymers thereof, with degassing by heat treatment in vacuo and adjustment in the final zones of the residual water content in the melt to an equilibrium concentration with the object of obtaining polycaproamide (or copolyamide) with a content of ≦1.5% of low molecular weight compounds for plastics and ≦1.8% for fibers, with high molecular weight stability and resistance to thermal degradation reactions.

2. Specific prerequisites for carrying out the process that are not known and that distinguish it from the closest prior art, including:

2.1 Degassing of the polycaproamide melt by heating in vacuo in an extruder in the presence of superheated steam, in order to separate low molecular weight compounds from the said melt, which is not known.

According to the process of Federal German Patent Application No. 2,340,261, degassing of the polycaproamide melt is carried out in an extruder by the introduction of saturated steam into the extruder and then by the absolutely necessary condensation of the saturated steam, which leads to an impairment of polymer quality due to hydrolysis and thermal decomposition and makes the operational process and the equipment more complex.

2.2 Treatment of the polycaproamide melt in the extruder with the admission of super-heated steam upstream of each degassing zone and maintaining or increasing the amount of steam to be introduced without increasing the temperature in the zones is also unknown.

According to the process of patent application Ser. No. 3,924,501/05 multiple introduction of superheated steam into the polyhexamethylene adipamide (PA 66) melt and subsequent degassing are employed, during which the object is achieved of increasing the viscosity and the throughput, reducing the energy intensity and obtaining a PA 66 with greater homogeneity. However, in this case the amount of superheated steam introduced in each successive zone is steadily reduced with a simultaneous increase in the process temperature in the individual zones.

It is known (according to the process of the inventor's certificate No. 817,032 of June 19, 1979) to distill off low molecular weight compounds from a polyamidecaproamide melt with the aid of a vacuum (residual pressure 50–450mm Hg or 66.5–598.5 mbar) in the presence of super-heated steam in a polycondensation apparatus.

However, the residual content of low molecular weight compounds according to this process is 2.96–5.32% instead of ≦1.8% according to the present invention.

2.3. The possibility of degassing polycaproamide melt in twin screw extruders or other apparatuses to a residual content of ≦1.8% of low molecular weight compounds while retaining the value of the relative viscosity both during degassing and in transport and processing of the demonomerized melt to form finished products, is not known.

According to the process of inventor's certificate No. 817,032 and the examples of the unaccepted Federal German Patent Specification No. 2,821,686 and according to SU Patent Application No. 3924501/05, corresponding to U.S. patent application Ser. No. 891,025, filed July 31, 1986, the disclosure of which is incorporated herein in its entirety by reference, the heat treatment in vacuo of the polyamide melt even in the presence of super-heated steam is always associated with an increase in the relative polymer viscosity.

According to the first process, the relative viscosity increases from 2.24 to 3.1-3.43, according to the second process from 2.55-2.78 to 2.98-3.27, and according to the third process from 2.7 to 7.5.

2.4. According to Federal German Patent Application No. 2,340,261, the degassing of the polycaproamide melt is carried out until traces of moisture have been completely eliminated. In the case of the present process, the amount of water dissolved in the demonomerized polymer in the final zones can be controlled, in order to ensure an equilibrium concentration, which substantially eliminates the undesired side reactions of thermal degradation, gel formation and uncontrollable reduction and increase of the molecular weight of the polymer.

Thus, the present process embodies a combination of features, selected after careful experimentation, that permit efficient demonomerization of crude polycaproamide melts while preserving their desirable viscosity characteristics and avoiding gel formation and degradation. The reduction in content of residual low molecular weight compounds is also unexpectedly and surprisingly effective by use of the process of the invention, resulting in a high quality PA6 product for use in plastics or fiber applications. It is seen that the present process solves many of the problems which detracted from the efficacy of even the closest prior art processes.

The advantages of the process of the invention are shown by the following illustrative examples:

EXAMPLE 1

Polycaproamide melt at a temperature of 250° C, with a relative viscosity of 2.82 and a content of DAU groups of $0.2 \times 10^{-6}$ gram equivalents/gram and a content of low molecular weight compounds of 9% is continuously fed in amounts of 6 kg/h into a ZFK-30 twin screw extruder with co-rotating, closely-intermeshing screws 30 mm in diameter, having a screw length, L/D =36 and 3 degassing zones, the extruder operating at a screw rotational speed of 70 rpm. The temperature of the polyamide melt in the corresponding zones is maintained at 250°-250°-250° C. Super-heated steam in an amount in each case of 0.2 kg/h is introduced into the polymer melt upstream of each degassing zone (the total amount of steam to be introduced is 110% of the original content of low molecular weight compounds).

The residual pressure in the degassing zones is correspondingly 20, 20 and 160 mbar.

After treatment in the extruder, the polycaproamide on leaving has a content of low molecular weight compounds of 1.02%, a content of 1,11-diamino-undecan-6-one (DAU) groups (a product of the side reaction of thermal degradation, with participation of terminal carboxyl groups of the polycaproamide) of $0.2 \times 10^{-6}$ gram equivalents/gram and a relative viscosity of 2.95, which has remained substantially unchanged during the 20-minute residence time of the polycaproamide in the melt. The unheated degassing pipework remains clean.

EXAMPLES 2-35

The process is carried out analogously to Example 1, under conditions of temperature, pressure, number of degassing zones, and amounts of steam shown in Table I. The results, in terms of relative viscosity, content of low molecular weight compounds, and DAU content can also be seen in Table I.

TABLE I

| Ex. No. | Amount of superheated steam introduced into the corresponding zones (I-IV), kg/h | | | | Total amount of steam relative to LMWCs, % | Residual pressure in the individual zones (I-IV), mbar | | | | Temperature in the individual zones (I-IV), °C | | | | Relative viscosity of the polymer | | | Content of low molecular weight compounds, % | | Content of DAU, g-equiv/g × 10⁻⁶ | |
|---|---|---|---|---|---|---|---|---|---|---|---|---|---|---|---|---|---|---|---|---|
| | I | II | III | IV | | I | II | III | IV | I | II | III | IV | Initial Viscosity | After extrusion | Final viscosity after 20 mins residence time in the melt | Initial content | After extrusion | Initial content | Final content |
| 1 | 2 | 3 | 4 | 5 | 6 | 7 | 8 | 9 | 10 | 11 | 12 | 13 | 14 | 15 | 16 | 17 | 18 | 19 | 20 | 21 |
| 2. | 0.27 | 0.27 | 0.27 | — | _150_ | 20 | 20 | 150 | — | 250 | 250 | 250 | — | 2.82 | 3.02 | 3.00 | 9.0 | 0.9 | 0.2 | 0.2 |
| 3. | 0.054 | 0.054 | 0.054 | — | _30_ | 20 | 20 | 150 | — | 250 | 250 | 250 | — | 2.82 | 3.00 | 3.00 | 9.0 | 1.8 | 0.2 | 0.2 |
| 4. | 0.28 | 0.28 | 0.3 | — | _160_ | 20 | 20 | 150 | — | 250 | 250 | 250 | — | 2.82 | 2.99 | 2.98 | 9.0 | 2.1 | 0.2 | 0.2 |
| 5. | 0.05 | 0.05 | 0.05 | — | _20_ | 20 | 20 | 150 | — | 250 | 250 | 250 | — | 2.82 | 2.99 | 2.98 | 9.0 | 2.1 | 0.2 | 0.2 |
| 6. | 0.2 | 0.2 | 0.2 | — | 110 | 20 | _2_ | 150 | — | 250 | 250 | 250 | — | 2.82 | 3.05 | 3.05 | 9.0 | 0.8 | 0.2 | 0.2 |
| 7. | 0.2 | 0.2 | 0.2 | — | 110 | _2_ | _1_ | 150 | — | 250 | 250 | 250 | — | 2.82 | 3.05 | 3.05 | 9.0 | 0.8 | 0.2 | 0.2 |
| 8. | 0.2 | 0.2 | 0.2 | — | 110 | _50_ | _50_ | 150 | — | 250 | 250 | 250 | — | 2.82 | 3.00 | 3.00 | 9.0 | 1.8 | 0.2 | 0.2 |
| 9. | 0.2 | 0.2 | 0.2 | — | 110 | _60_ | _60_ | 150 | — | 250 | 250 | 250 | — | 2.82 | 2.99 | 2.99 | 9.0 | 2.1 | 0.2 | 0.2 |
| 10. | 0.2 | 0.2 | 0.2 | — | 110 | 20 | 20 | _350_ | — | 250 | 250 | 250 | — | 2.82 | 3.00 | 2.97 | 9.0 | 1.8 | 0.2 | 0.2 |
| 11. | 0.2 | 0.2 | 0.2 | — | 110 | 20 | 20 | _360_ | — | 250 | 250 | 250 | — | 2.82 | 2.99 | 2.94 | 9.0 | 1.9 | 0.2 | 0.2 |
| 12. | 0.2 | 0.2 | 0.2 | — | 110 | 20 | 20 | _50_ | — | 250 | 250 | 250 | — | 2.82 | 3.05 | 3.06 | 9.0 | 0.8 | 0.2 | 0.2 |
| 13. | 0.2 | 0.2 | 0.2 | — | 110 | 20 | 20 | _40_ | — | 250 | 250 | 250 | — | 2.82 | 3.03 | 3.08 | 9.0 | 0.8 | 0.2 | 0.4 |
| 14. | 0.2 | 0.2 | — | — | 110 | 2 | 50 | _40_ | — | 250 | 250 | 250 | — | 2.82 | 3.00 | 2.99 | 9.0 | 1.8 | 0.2 | 0.2 |
| 15. | _0.3_ | _0.3_ | — | — | 140 | 2 | — | — | — | 250 | 250 | 250 | — | 2.82 | 2.98 | 3.06 | 9.0 | 2.5 | 0.2 | 0.8 |
| 16. | _0.8_ | _0.15_ | _0.15_ | _0.15_ | 150 | 2 | 2 | 20 | 150 | 250 | 250 | 250 | 250 | 2.82 | 3.03 | 3.03 | 9.0 | 0.6 | 0.2 | 0.2 |
| 17. | _0.15_ | 0.2 | 0.2 | 0.2 | 110 | 20 | 20 | 20 | 150 | 250 | 250 | 250 | 250 | 2.82 | 3.03 | 3.03 | 9.0 | 0.5 | 0.2 | 0.2 |
| 18. | 0.2 | 0.2 | 0.2 | — | 110 | 260 | 20 | 150 | — | 260 | 250 | 240 | — | 2.82 | 3.02 | 3.02 | 9.0 | 1.0 | 0.2 | 0.2 |
| 19. | 0.2 | 0.2 | 0.2 | — | 110 | 20 | 20 | 150 | — | _280_ | _240_ | _280_ | — | 2.82 | 3.00 | 2.95 | 9.0 | 1.8 | 0.2 | 0.2 |
| 20. | 0.2 | 0.2 | 0.2 | — | 110 | 20 | 20 | 50 | — | _280_ | _270_ | _250_ | — | 2.82 | 3.00 | 3.00 | 9.0 | 1.6 | 0.2 | 0.4 |
| 21. | 0.2 | 0.2 | 0.2 | — | 110 | 20 | 20 | 50 | — | _290_ | _290_ | _290_ | — | 2.82 | 2.98 | 2.93 | 9.0 | 2.8 | 0.2 | 0.2 |
| 22. | 0.2 | 0.2 | 0.2 | — | 110 | 20 | 20 | 150 | — | _290_ | 280 | 270 | — | 2.82 | 2.98 | 2.95 | 9.0 | 2.4 | 0.2 | 0.2 |
| 23. | — | — | — | — | — | 2 | 2 | 2 | 150 | 250 | 250 | 250 | 250 | 2.82 | 3.00 | 3.11 | 9.0 | 1.8 | 0.2 | 1.2 |
| 24. | 0.17 | 0.25 | 0.38 | — | 150 | 20 | 20 | 150 | — | 250 | 250 | 250 | — | 2.82 | 3.05 | 3.05 | 9.0 | 0.9 | 0.2 | 0.2 |
| 25. | 0.3 | 0.4 | _0.01_ | — | 140 | 2 | 2 | — | — | 250 | 250 | 250 | — | 2.82 | 3.02 | 3.02 | 9.0 | 1.5 | 0.2 | 0.2 |
| 26. | 0.4 | 0.45 | _0.5_ | — | 150 | 2 | 2 | 50 | — | 250 | 250 | 250 | — | 2.82 | 3.02 | 3.01 | 9.0 | 0.5 | 0.2 | 0.2 |
| 27. | 0.3 | 0.45 | _0.6_ | — | 150 | 2 | 2 | 50 | — | 250 | 250 | 250 | — | 2.82 | 3.01 | 2.97 | 9.0 | 0.5 | 0.2 | 0.2 |
| 28. | 0.3 | 0.4 | — | — | 140 | 2 | 2 | 50 | — | 250 | 250 | 240 | — | 2.82 | 3.02 | 3.08 | 9.0 | 1.5 | 0.2 | 1.0 |
| 29. | 0.2 | 0.2 | 0.2 | — | 110 | 20 | 20 | 150 | — | _240_ | _240_ | _240_ | — | 2.35 | 2.50 | 2.50 | 10.0 | 0.8 | — | — |
| 30. | 0.2 | 0.2 | 0.2 | — | 110 | 20 | 20 | 50 | — | 250 | 250 | 240 | — | 2.35 | 2.51 | 2.53 | 10.0 | 0.75 | — | — |
| 31. | 0.2 | 0.2 | 0.3 | — | 140 | 10 | 20 | 50 | — | 280 | 270 | 270 | — | 3.5 | 3.70 | 3.71 | 7.0 | 1.2 | 0.4 | 0.4 |
| 32. | 0.2 | 0.2 | 0.3 | — | 110 | 2 | 2 | 150 | — | 280 | 280 | 280 | — | 3.5 | 3.74 | 3.70 | 7.0 | 0.7 | 0.4 | 0.4 |
| 33. | 0.2 | 0.2 | 0.2 | — | 140 | 2 | 2 | — | — | 250 | 240 | 240 | — | 2.52 | 2.73 | 2.73 | 14.0 | 1.1 | — | — |
| 34. | 0.3 | 0.4 | 0.006 | — | 150 | 2 | 2 | 150 | — | 270 | 265 | 265 | — | 3.00 | 3.24 | 3.24 | 10.0 | 1.2 | 0.2 | 0.2 |
| 35. | 0.3 | 0.4 | 0.003 | — | 150 | 2 | 2 | — | — | 270 | 265 | 265 | — | 3.00 | 3.24 | 3.29 | 10.0 | 1.2 | 0.2 | 0.4 |

Footnotes:
(1) Singly underlined data are the limiting values of the parameters according to the wording of the claims, and doubly underlined data are values of the parameters lying outside the invention.
(2) *denotes blocking of the exhaust system for LMWC-vapors.

A summary comparison of the process of the present invention with prior art processes is presented in Table II.

TABLE II

| | | Technological process parameters | | | | | | |
|---|---|---|---|---|---|---|---|---|
| Ex. No. | Tech. solution | Apparatus used to carry out the process | Residual pressure, mbar | Melt temperature, °C. | Maximum number of degassing sections required | Auxiliary used; amount | Melt pressure in steam admission zones, bar | Blocking of pipework by caprolactam and oligomers |
| 1. | 2. | 3. | 4. | 5. | 6. | 7. | 8. | 9. |
| 1. | Process according to the invention | Twin-screw extruder with degassing in vacuo under the action of heat. | 2–350 | 240–280 | 2 | Superheated steam, 30–150%, relative to LMWCs. | 9.8–20 | Eliminated |
| 2. | Prototype FRG Pat. Appl. No. 2340261, published March 6, 1975, C 08 G, 69/46 | Twin-screw extruder with degassing in vacuo under the action of heat. | 1.33–13.3 | | 4 | Saturated steam | 33.3–64.2 | Possible after the first two zones and the final zone |
| 3. | Analogous state of the art FRG Pat. Appl. No. 2821686, published Nov. 22, 1979, C 08 G, 69/16 | Twin-screw extruder with degassing in vacuo under the action of heat. | 0.40–6.55 | 250–290 | — | Caprolactam melt for condensing LMWC-vapors. 50–100 l/kg of PA6 melt. | — | Possible crystallization of the lactam on the walls of the pipework. Heating necessary. |
| 4. | FRG Patent No. 2503308, published March 10, 1983 C 08 G, 69/46 | Heat treatment in vacuo in thin-layer apparatus | 7.98–79.8 | 240–290 | 1 | Superheated steam, 10–100%, relative to LMWCs. | | Possible crystallization of the lactam on the walls of the pipework. Heating necessary. |
| 5. | SU-Inventor's certificate No. 817032, published March 30, 1981, C 08 G, 69/16 | Heat treatment in vacuo in apparatus with a mixing device | 6.65–59.85 | — | 1 | Superheated steam, 10–100%, relative to LMWCs. | | |
| 6. | Process used industrially for treating granules with water while heating. | Apparatus with a large space requirement | — | — | | Hot water at a temperature of 110–135° C., 2 t/t of polymer | | |

| | | Relative viscosity of PA6 | | | | |
|---|---|---|---|---|---|---|
| | LMWCs Content, % | | | | Final viscosity after 20 mins | DAU content |
| Ex. No. 1. | Initial content 10. | After extrusion 11. | Initial viscosity 12. | After extrusion 13. | residence time in the melt 14. | Initial content 15. | Final content 16. |
| 1. | 7–14 | ≦1.5 for plastics, ≦1.8 for fibers | 2.35–3.5 | 2.44–3.81 | 2.44–3.81 | Unchanged | Unchanged |
| 2. | 8–10 | | | | Uncontrollable increase due to water | Uncontrollable increase | Uncontrollable increase |

TABLE II-continued

| | | | | | | | |
|---|---|---|---|---|---|---|---|
| 3. | 7–8 | ~2, (including 0.3–0.45 of monomers and dimers 1.6 of high-melting oligomers) | 2.55–2.78 | 2.99–3.27 | removal Uncontrollable increase due to water removal | Uncontrollable increase | Uncontrollable increase |
| 4. | 9 (14–16) | 3.6–3.9 (including 0.9–1.2 of monomers and 2.7 of oligomers) | 2.2–2.3 | — | — | — | — |
| 5. | 4.5–13.5 | 3–6 | 2.24 | 3.1–3.4 | 3.1–3.4 | Unchanged | Unchanged |
| 6. | 7–14 | 1.5 | 2.35–4 | 2.47–4 | 2.47–4 | Unchanged | Unchanged |

From the foregoing description, one skilled in the art can easily ascertain the essential characteristics of this invention and, without departing from the spirit and scope thereof, can make various changes and modifications of the invention to adapt it do various usages and conditions.

What is claimed is:

1. A process for separating low molecular weight compounds from a crude polycaproamide melt, comprising the step of heat treating a crude polycaproamide melt, containing low molecular weight monomers and oligomers of caproamide and by-products thereof, said heat treatment being effected in vacuo, in an extruder having a plurality of degassing zones, wherein superheated steam is introduced into the polymer melt upstream of each degassing zone in a total amount of 30–150%, relative to the amount of low molecular weight compounds, the low molecular weight compounds and the superheated steam are withdrawn in 2 or more zones, a residual pressure of 2–50 mbar is maintained in all but the final zone and a residual pressure of 5 to 350 mbar is maintained in the final zone, and the melt temperature is either held constant between 240°–280° C or is steadily reduced over the length of the extruder from 280° C to 240° C, whereby the occurrence of side reactions and dehydration of the melt are substantially eliminated, the molecular weight of the polymer during the heat treatment in vacuo, during transport and subsequent processing remains substantially unchanged, a residual content of low molecular weight compounds of $\leq 1.8\%$ is achieved, and the operating flexibility of the process is increased.

2. The process of claim 1, wherein the amount of superheated steam introduced upstream of each successive degassing zone is 100–150% of the amount of steam introduced into the preceding zone.

3. The process of claim 1, wherein after removal of the low molecular weight compounds from the polycaproamide melt up to a residual content of $\leq 1.8\%$ in the final zone, 0.1–5%, relative to the polymer, of superheated steam is introduced without degassing or with subsequent degassing at a residual pressure of 5–350 mbar.

* * * * *